(12) United States Patent
Bergmüller et al.

(10) Patent No.: US 11,281,954 B2
(45) Date of Patent: Mar. 22, 2022

(54) TAMPER-ACTIVATED AUTHENTICABLE SECURITY DEVICE

(71) Applicant: Authentic Vision GmbH, Wals (AT)

(72) Inventors: Thomas Bergmüller, Wals (AT); Thomas Weiss, Wals (AT)

(73) Assignee: Authentic Vision GmbH, Wals (AT)

(*) Notice: Subject to any disclaimer, the term of this patent is extended or adjusted under 35 U.S.C. 154(b) by 0 days.

(21) Appl. No.: 16/649,318

(22) PCT Filed: Sep. 21, 2018

(86) PCT No.: PCT/EP2018/075575
§ 371 (c)(1),
(2) Date: Mar. 20, 2020

(87) PCT Pub. No.: WO2019/057877
PCT Pub. Date: Mar. 28, 2019

(65) Prior Publication Data
US 2020/0265282 A1  Aug. 20, 2020

(30) Foreign Application Priority Data

Sep. 22, 2017  (EP) .................................. 17192683

(51) Int. Cl.
*G06K 19/00* (2006.01)
*G06K 19/07* (2006.01)
(Continued)

(52) U.S. Cl.
CPC ......... *G06K 19/0723* (2013.01); *B42D 25/36* (2014.10); *G06K 19/06028* (2013.01);
(Continued)

(58) Field of Classification Search
CPC ................ G06F 21/86; B65D 33/2591; B65D 2543/00296; B65D 2401/15;
(Continued)

(56) References Cited

U.S. PATENT DOCUMENTS 4,458,817 A  7/1984  Guala
6,087,075 A  7/2000  Kier et al.
(Continued)

FOREIGN PATENT DOCUMENTS

CH       707871 A2    10/2014
DE   102015003837 A1   9/2016
(Continued)

OTHER PUBLICATIONS

Extended European Search Report Application No. EP 17 19 2683 Completed: Apr. 20, 2018; dated May 3, 2018 7 pages.
Written Opinion of the International Searching Authority and International Search Report Application No. PCT/EP2018/075575 Completed: Dec. 20, 2018; dated Jan. 7, 2019 8 pages.

*Primary Examiner* — Jamara A Franklin
(74) *Attorney, Agent, or Firm* — Whitmyer IP Group LLC

(57) ABSTRACT

A security device and a method for verifying such a security device are disclosed. The security device has at least two security features. At least one of the security features is a tamper-evident security feature, which is configured to alter irreversibly upon mechanical tampering with the security device. At least one other of the security features is a robust security feature, which is robust against tampering with the security device. The at least two security features can be extracted from at least one image of the security device with a programmable device having a camera at least in an intact state of the security device.

13 Claims, 7 Drawing Sheets

(51) Int. Cl.
*B42D 25/36* (2014.01)
*G06K 19/06* (2006.01)
*G09F 3/00* (2006.01)
*B42D 25/328* (2014.01)

(52) U.S. Cl.
CPC ..... *G06K 19/06037* (2013.01); *G09F 3/0292* (2013.01); *B42D 25/328* (2014.10)

(58) Field of Classification Search
CPC ............ B65D 2401/00; B65D 41/3428; B65D 2203/10; G09F 3/0292; G09F 3/10; G09F 3/0288; G09F 3/0341; G06Q 20/341; B42D 25/00; B42D 25/29; B42D 25/23; G06K 19/07749; G06K 19/07798; G06K 19/0723; G07F 7/1008
USPC ............... 235/375, 379, 380, 385, 488, 492; 283/72, 81; 206/459.1, 459.5, 807; 383/5; 340/568.1, 572.1; 220/266
See application file for complete search history.

(56) References Cited

U.S. PATENT DOCUMENTS

| | | | |
|---|---|---|---|
| 8,944,470 | B2 | 2/2015 | Mayrhofer et al. |
| 9,114,912 | B2 | 8/2015 | Giovannini et al. |
| 10,943,162 | B2 * | 3/2021 | Herranen ......... G06K 19/06037 |
| 2001/0005570 | A1 | 6/2001 | Daniel et al. |
| 2015/0188706 | A1 | 7/2015 | Weiss |
| 2016/0297231 | A1 | 10/2016 | Weiss |
| 2017/0053200 | A1 | 2/2017 | Bright |

FOREIGN PATENT DOCUMENTS

| | | |
|---|---|---|
| EP | 1538554 A2 | 6/2005 |
| EP | 3293680 A1 | 3/2018 |
| WO | 9418087 A1 | 8/1994 |
| WO | 0153106 A1 | 7/2001 |
| WO | 2011127279 A2 | 10/2011 |
| WO | 2012035546 A2 | 3/2012 |
| WO | 2016207549 A1 | 12/2016 |
| WO | 2017097962 A1 | 6/2017 |

* cited by examiner

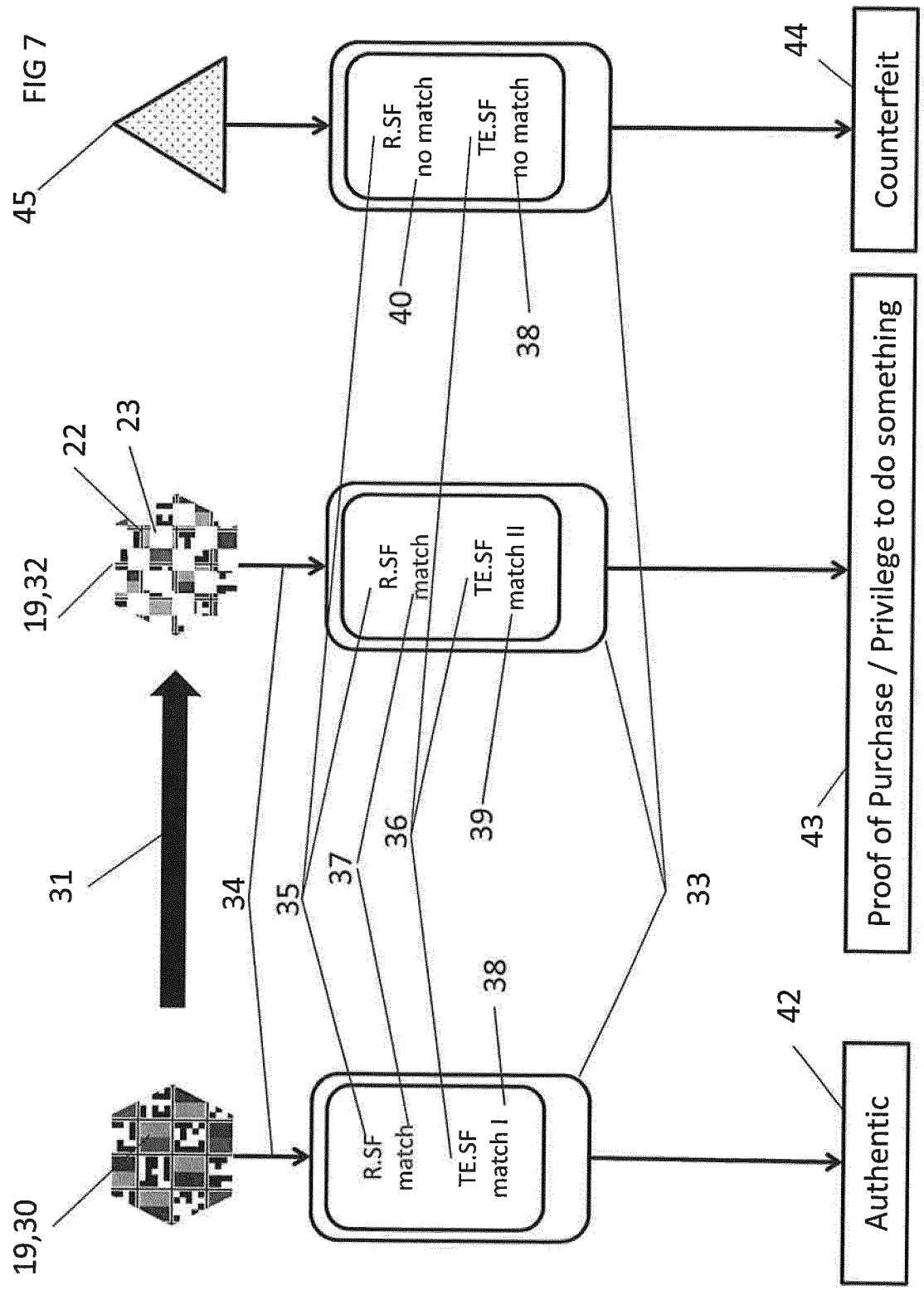

TAMPER-ACTIVATED AUTHENTICABLE SECURITY DEVICE

TECHNICAL FIELD

Today a variety of anti-counterfeiting solutions is available, often utilizing security devices. For security devices, various technologies exist making them applicable in authentication solutions and tamper-evident seals. Yet there are next to no solutions available, which effectively combine the aspects of authentication with the benefits of a seal. In many solutions, the authentication is pre-conditioned by an unbroken seal and/or once the seal is broken, authentication is no longer possible. In authentication, the goal is to determine, whether something, e.g. an object, originates from a genuine source, i.e. the source it claims to originate from. A seal, on the other hand, is designed in a way, such that one can determine whether the seal (and hence the object or value it protects) has been tampered with, i.e. the seal is broken, or not. In particular, there are no solutions, which allow to automatically verify the authenticity and the integrity of a security device independently. Such solutions, with an independent proof of authenticity and integrity, are required in applications, where the security device should be authenticable, regardless whether the same security device has been tampered with or not. Even more so, such a solution is required, if there is a special interest in verifying the authenticity and knowing, that the (authentic) security device has been tampered with. This translates to knowing that an authentic seal has been broken. It might be beneficial to have a security device, which can be authenticated in any case, i.e. before and after it has been tampered with. Additionally, it might be beneficial to distinguish a counterfeit tampered security device from an authentic tampered security device.

There is therefore a desire for a security device, that is structured in a way such that the authenticity and integrity of said security device can be assessed independently and automatically using a programmable device comprising a camera.

BACKGROUND

Naturally, there are security devices available, which are described as tamper-evident authentication devices. Typically, they can be authenticated, as long as the security feature has not been tampered with. Often, they are designed in a way, such that tampering with the security devices ultimately destroys the security device or results in a negative authentication result. Therefore, after the security device has been tampered with, no authentication is possible.

US 2001/0005570 A1 discloses a method for marking articles or documents by placing on a substrate a multi-layer optical complex consisting of an identifying portion such as bar codes, a photograph or characters, and an authenticating portion consisting of a diffracting optical mark, said portions being arranged one on top of the other in such a way that they cannot be separated without destroying the authenticating portion. The declared purpose of the arrangement is, that tampering will destroy the optical complex, i.e. the identifying portion and the authentication portion. No possibility of authenticating the tampered and destroyed optical complex is disclosed. Moreover, US 2001/0005570 A1 mentions that the authentication portion is required to authenticate the identifying portion.

DE 10 2015 003 837 A shows a method and system for securing an object against counterfeiting by means of a sealing element, which comprises an antenna structure, for example a coil, which can be regarded as an electrical resonant circuit.

For a better understanding of the problem, we will subsequently resort to some example use-cases: In many countries, counterfeit alcohol is a major issue for health- and tax-loss reasons. Often, authentic bottles are harvested from the dump and are refilled with counterfeit alcohol. In another setting, authentic bottles are opened, the genuine alcohol removed (and possibly sold at the black market) and replaced by counterfeit alcohol. The authentic bottles with the counterfeit alcohol are then put to the shelves, where clueless consumers purchase and consume it.

As a first step to prevent this from happening, manufacturers have resorted to replenishment-protection closures (e.g. as proposed in U.S. Pat. No. 4,458,817 A), which hardens or prevents the replenishment of a bottle. For a counterfeiter, a possible way around that is to harvest authentic bottles, remove the original closure, replenish the bottle and equip it with a mimicked closure. For consumers, it is next to impossible to distinguish an authentic closure from a mimicked one. Therefore, the need for an authentication solution of the closure itself emerges. This allows the consumer to verify, whether a particular closure is authentic, i.e. the replenishment-protection is still intact, or if the closure is a mimicked one, i.e. it can be assumed that the closure and therefore the bottle's content has been tampered with.

In order to allow closure authentication, basically any security device and automatic verification system will do, e.g. as proposed in earlier work in US 2015/0188706 A. This exemplary solution allows a consumer to verify the authenticity of a closure equipped with a security device by using a programmable device comprising a camera, e.g. a smartphone, without any additional equipment. However, even though their health is at stake, consumers are generally reluctant (presumably for convenience reasons) to authenticate such security devices prior to consumption of the protected good, i.e. the liquor inside the bottle. One way to help increase authentication rates is to engage consumers to do so by offering benefits or rewards for each conducted authentication, similar to the well-known concept of loyalty programs. There are several different business models possible. In one model, every person, who authenticates the security device, may get a reward. However, people may start going to retailers and scan the security devices off the shelves in order to harvest as many rewards as possible—which is of course undesirable and basically renders the incentive ineffective. Brands offering those incentive-programs are therefore forced to either grant only small rewards for commercial reasons. Or they hand out the reward precisely once, for each authenticated security device. In the latter setting, this would imply that a legitimate buyer may not get the reward, because an illegitimate non-buyer already harvested it "off" the security device. Therefore, one needs to ensure that only the person who purchases an object gets the right to harvest the reward, if he or she authenticates the corresponding security device. In such a setting, it is important to establish a proof of purchase, respectively a claim of ownership.

A well-known solution to this problem is to place e.g. a code, which is physically inaccessible without opening the packaging, e.g. opening a bottle. Many marketing campaigns operate under this principle. It is common to place a—often numerical or alpha-numerical—voucher code inside a bottle cap, at the inner side of a label (which can only be seen once the content of a bottle has been emptied) or in a security scratch panel. This code can only be accessed, if the packaging is broken/tampered with, which is in a sensible setting only done by the legitimate buyer.

WO 2011/127279 A1 presents a combination of a tamper-evident package and a unique identifier, which can be used for authentication purposes. The unique identifier cannot be detected from the outside of the tamper-evident packaging. Hence accessing it, inevitably demonstrates evidence of tampering. Consequently, it is impossible to verify the authenticity prior to manipulating the tamper-evident packaging. Similar to this solution, all other solutions, where the authenticable part of a security device is protected through the tamper-evident part of the security device, cannot be used in the use cases described above. This is, because the authentication is not independent of the tamper-evidence.

WO 2016/207549 A1 presents a solution, where a first code, which can be used for authentication purposes, is placed outside a tamper-evident packaging, e.g. outside a bottle, and a second code, which is placed inaccessible from outside the bottle. However, no solution for automatically detecting tamper-evidence is presented. Even more so, the second code, which can only be detected after tampering with/opening the presented bottle, is required for authentication as well. Therefore, also with this solution, no authentication is possible independently, without tampering with the bottle.

WO 94/18087 A1 presents a solution, where a code, located outside a bottle cap, is irreversibly separated upon opening of the bottle. Said code may be used for authentication prior and after opening the bottle, however, there is no automated or machine-aided method available, which helps the user to detect tamper-evidence, ultimately requiring user-guidance or—education. Also, such a solution cannot be employed for proof-of-purchase/claim-ownership use cases, where rights to access additional value are bound on the precondition of detecting a broken but authentic seal, i.e. an authentic security device, which has been tampered with.

Also, WO 01/53106 A1 presents a method, where the authentication-critical part of the security device is inaccessible prior to opening a tamper-evident container, e.g. a bottle.

As mentioned, there is a desire for a security seal, which can be checked for authenticity and integrity. In particular, these checks can be done independently, for example the authenticity can still be verified, although the seal is already broken. There are tamper-evident security devices available, which can also be authenticated, but only as long as they are not broken, i.e. integrity and authenticity depend on each other. Such tamper-evident security devices work under the premises that tampering with the security device, e.g. removing it from the object it is protecting, destroys the security device in a way, such that it cannot be authenticated any more.

In a different field of application, CH 707 871 A2 presents an authenticable device for counting accesses to a suitcase. The device is protected against replacement of the counter by a tamper-evident security feature.

Tamper-evident security devices are typically designed in a way such that the tamper-evident part is an overt security feature, which is, however, not detected explicitly, e.g. automatically by optical means. It is merely the responsibility of the user to know about and assess the status of the overt tamper-evident feature.

One example of such overt tamper-evident security features are tamper-evident labels, especially tamper-evident holographic labels. Such solutions are also commonly known as "void-holograms". Most prominently with holograms, these security devices have a certain structure, which is characterized in a void-pattern becoming visible, once the security device is tampered with. Often this is a chessboard-pattern, parts of the hologram are destroyed or the word "INVALID" or "VOID" emerges (hence the name). This tamper-evident pattern is typically activated through mechanical or chemical triggers, for example through removing the security device from the object. Also, the opening of a container, which is sealed with the security device, causes mechanical stress, so does changing the temperature (cool-chain) etc. There are ways to tamper with such security devices only causing minimal tampering-effects or do not activate the tamper-evident structure at all. For example, one could cut through a break-point with a surgical knife (a counter-measure is presented in WO 2017/097962 A1), de-activate tension-based triggers, e.g. when opening a container or bottle, by cutting a thin line, which is hardly visible to the human eye, etc. So, it is relatively easy to spoof the manual assessment of the tamper-evident feature, simply because the tampering might be overlooked or go undetected by the human eye. The decision, whether the security device has been tampered with, is merely up to the possibly uneducated observer and might therefore be ineffective due to the lack of education. The natural way is to resort to device-aided verification of the seal.

However, many device-aided security-seal solutions heavily rely on the seal being destroyed, once it is tampered with. A typical approach is to verify the authenticity of the security device, and if this is possible claim that the security device's integrity is intact as well, i.e. it has not been tampered with. Especially, if it is possible to tamper with a particular security device in a way, such that the tamper-evident structure is not activated or the effects are marginal, this is also inherently problematic for automated tamper-evident security feature assessment and does not offer an effective integrity-verification at all. For containers and packaging, there is an RFID-based solution presented in US 2017/0053200 A1, which allows to detect the continuity of a package or container. In other words, it provides an "is open" detection based on breaking RFID-antennas, once the packaging—and therefore the seal—is broken.

To the best of our knowledge, there is currently no security device available, which allows verifying its authenticity and integrity independently by using a programmable device comprising a camera, especially without requiring any additional equipment.

Summing up, the state of the art are security devices, which are called tamper-evident, if tampering with the security device results in destroying said security device, the authentication being no longer possible or with a negative outcome (given the security device tampered with is authentic).

SUMMARY

Accordingly, it is an object of the present teaching to provide a tamper-evident security device and a method which allows to confirm the integrity and authenticity of the security device independently.

It becomes therefore possible, to authenticate the security device, even if it has been tampered with. This is particularly useful, if both aspects, integrity and authenticity, are crucial, but for different purposes. As indicated in the outset, the state "authentic, but integrity not given" can be seen as a proof of purchase of an authentic item. This may in turn be used to grant the privilege to access some added value behind a security device. So if now added value is put behind the authentication process, it is beneficial, if this value can only be harvested once the tampering occurs, i.e. the security device has rightfully been tampered with. In this sense, one could also refer to the proposed present teaching as a tamper-activated authenticable security device.

Agreeably, as for the liquor-bottle use case, destroying the option to harvest the additional value once the seal is broken might generally be useful to engage consumers to verify the authenticity and integrity before opening the packaging or container. In a general case, however, it might be desirable to also or only allow consumers to harvest the additional value after they've opened the packaging or container, hence broken the integrity of the security device. Naturally, this should only be possible for authentic security devices, so once again, the security device employed to protect this additional value is a tamper-activated authenticable security device. To ensure, the tampered security device is indeed authentic, the automated authentication should still be possible, even after rightfully tampering with the security device. Consequently, a tamper-evident security device, which destroys itself when tampered with, will not work for such an application setting.

In the following we present a tamper-evident security device and a method, which allows to verify the authenticity and integrity of the security device independently. We further will introduce several embodiments of the present teaching, one of which is to use the present teaching as a tamper-activated authenticable security device, characterized in that said security device can be employed to protect additional value, which should only be accessible after the authentic security device has been rightfully tampered with.

In order to achieve the objective mentioned above, the present teaching provides a security device having at least two security features, where at least one of said security features is a tamper-evident security feature, which is configured to alter irreversibly upon a mechanical tampering with the security device, and at least one other of said security features is a robust security feature, which is robust against the mechanical tampering with the security device, wherein the at least two security features can be extracted from at least one image of the security device with a programmable device comprising a camera at least in an intact state of the security device. The security features are preferably optical security features, allowing for visual extraction. To enable extraction, the security features are visible in an intact state of the security device. The intact state of the security device is the state in which the integrity of the security device is given. The term "security feature" refers to a feature or property of the security device. Preferably the structure of the security device having said feature or property is difficult to copy at least at economic scale, thereby justifying the term "security". A security feature can be an optical property (color or brightness), a variable optical property (color changing with angle of view), a distance between reference points, a spacing of a grid, the structure of a line (full, dashed, etc.), a visual code or sign (letter, bar-code, etc.), the area enclosed by a closed frame or between reference points, an error rate experienced when decoding a visual code (e.g. a QR-code with error-correction information) and so on. A tamper-evident security feature is a feature that has a first value or assumes a first state when the security device is intact and a second value or second state when the security device has been tampered with. The first and second value and the first and second state refer to properties that can be extracted from the at least one image of the security device with a programmable device comprising a camera (e.g. a smartphone). That the tamper-evident security feature is configured to alter irreversibly upon a mechanical tampering with the security device means that it is not possible (at least not with reasonable effort) to reverse the change experienced by the security device due to the mechanical tampering, such that the tamper-evident security feature again has the first value or assumes the first state. For example, the tamper-evident security feature may be the spacing of lines printed on a stretching foil or shrinking foil: once the foil has been tampered with and deformed, it is practically impossible to recover the original spacing so precisely that a programmable device would not detect the difference. Another example would be the alignment of robust security features on interleaved chessboard patterns: once the chessboard patterns have been separated by mechanical tampering, it is practically impossible to recover the original alignment so precisely that a programmable device would not detect the difference. The term "robust security feature" means that this security feature is relatively more stable and stronger than the tamper-evident security feature. It does not mean that the security feature is immutable to mechanical tampering, but that usual mechanical tampering within the purpose and function of the security device leaves the robust security feature unchanged.

Preferably, the at least two security features (i.e. including the tamper-evident security feature and the robust security feature) can be extracted from at least one image of the security device with a programmable device comprising a camera also in a tampered state of the security device. That means that in this preferred embodiment, not only the first value or first state, but also the second value or second state of the tamper-evident security feature as defined above can be extracted with the programmable device comprising a camera, i.e. is visually detectable. The advantage here is, that a positive visual confirmation of the "tampered" state of the security device can be achieved, thus making it more difficult to forge this state with an actually untampered security device (e.g. by covering parts of the security device, removing parts of the security device, and so on).

It has turned out advantageous that in an intact state of the security device, the at least one tamper-evident security feature of the security device assumes a pre-determined value or state. In other words, the first value or first state as defined above is pre-determined in this case. This makes it relatively easy to detect and positively confirm the "intact" state of the security device.

Moreover, in a tampered state of the security device, the at least one tamper-evident security feature of the security device may assume a pre-determined value or state or a value within a pre-determined range. In other words, the second value or second state as defined above is pre-determined in this case or at least within a predetermined range. This makes it relatively easy to detect and positively confirm the "tampered" state of the security device.

In a preferred application of the security device attached to an object (or a product or item), the at least one tamper-evident security feature and the at least one robust security feature are features of a structure, which is partitioned into at least two sections, wherein at least one section has stronger adhesion to the object and at least one other section has stronger adhesion to a carrier material of the security device and the structure partially destroying or splitting the security device if the security device is being tampered with, where the at least one robust security feature is distributed among the at least two sections, such that the at least one section remaining on the object and/or the at least one other section can be authenticated. This is a preferred embodiment of the principle described above with respect to interleaved chessboard patterns, i.e. separation of the patterns or sections is achieved by adhesion to different parts of the security device, which need to be separated to access the object or product.

Advantageously, the at least two security features are properties of partially or completely overlapping parts (or areas or regions) of the security device. In other words, robust security features and tamper-evident security features are not attributed to geometrically separable parts of the security device. This makes it more difficult to spoof an authentication by changing the image(s) used for extracting the security features. It guarantees that the tamper-evident security features are recorded and can be extracted together with the robust security features. For example, when the tamper-evident security features are defined based on the relative arrangement of robust security features, there is inherently and necessarily an overlap in the parts of the security device representing both security features.

To improve the security of the security device against counterfeiting, i.e. production of forged security devices, at least one security feature can be a random or unique security feature. These random or unique security features can be registered and are typically significantly more difficult to copy than to produce legitimately.

Preferably, the security device comprises an identifier. The identifier can be a simple datum easily recognizable and reproducible. It allows identification of the security device for purposes of tracking, verification or documentation of the security device or the object or product it can be attached to. Further, said random or unique security features may be registered to the simple datum and can be accessed during authentication if needed.

The present teaching also provides a method for verifying a security device as described above, the method comprising:

recording at least one image of the security device;
extracting the at least two security features from the at least one recorded image;
comparing the value of the at least one extracted robust security feature with a pre-determined value and notifying authenticity of the security device if the compared values match; and
comparing the value of the at least one extracted tamper-evident security feature with a pre-determined value or state corresponding to an intact state of the security device and notifying integrity of the security device if the comparison finds a match.

Here "integrity" refers to the intact state of the security device and—typically—of the object or product it is attached to. It is important to note that the above-defined method allows to positively confirm authenticity and integrity, but does not positively confirm the "tampered" state of the security device (it can only find that integrity cannot be confirmed).

Therefore, a preferred method further comprises:
comparing the value of the at least one extracted tamper-evident security feature with a pre-determined value or state or a pre-determined 'range of values, corresponding to a tampered state of the security device and notifying tampering of the security device if the comparison finds a match.

To improve security of the present method, the tamper-evident security feature can be combined with the robust security feature to verify authenticity: advantageously, the method may be characterized in that before notifying authenticity, it is checked whether the at least one extracted tamper-evident security feature either matches a pre-determined value or state, corresponding to an intact state of the security device, or matches a pre-determined value or state or a pre-determined range of values, corresponding to a tampered state of the security device, and authenticity is notified only if one of these matches is found.

It has turned out advantageous to employ the extracted and/or pre-determined value of the at least one tamper-evident security feature to support the extraction and/or authentication of the at least one robust security feature. This can be achieved by producing the tamper-evident security features such that they are related to robust security features (e.g. a different visual representation). In this way, the tamper-evident security features can be used to reconstruct/compensate or aid in any other way the extraction of the robust security features, thereby making the extraction easier and faster. This immediately allows to detect whether the tamper-evident features assume their first value or first state, indicating an intact or untampered security device (in which case there will be more complete information corresponding to the robust security features than when the tamper-evident security features have been altered).

In order to obtain the reference values or states for the different security features, the method preferably comprises:
before the comparing steps, extracting an identifier of the security device from the at least one recorded image and retrieving a pre-determined value or state or a pre-determined range of values, corresponding to a value or state of the tamper-evident security feature in an intact or tampered state of the security device, and associated with the extracted identifier, from a memory. The memory may be a local memory or database or a remote database or storage, e.g. accessible via a web service.

Finally, the present teaching also provides a programmable device comprising a camera and configured to perform the steps of a method as described above and to indicate the authenticity and/or integrity of the security device and/or to trigger a specific action based on the combination of the authenticity and integrity results.

BRIEF DESCRIPTION OF THE DRAWINGS

The present teaching will be explained in detail on the basis of the attached drawings. These show exemplary embodiments of the present teaching:

FIG. 7 illustrates a method for verifying a security device according to the present teaching.

DETAILED DESCRIPTION

Figure 1:
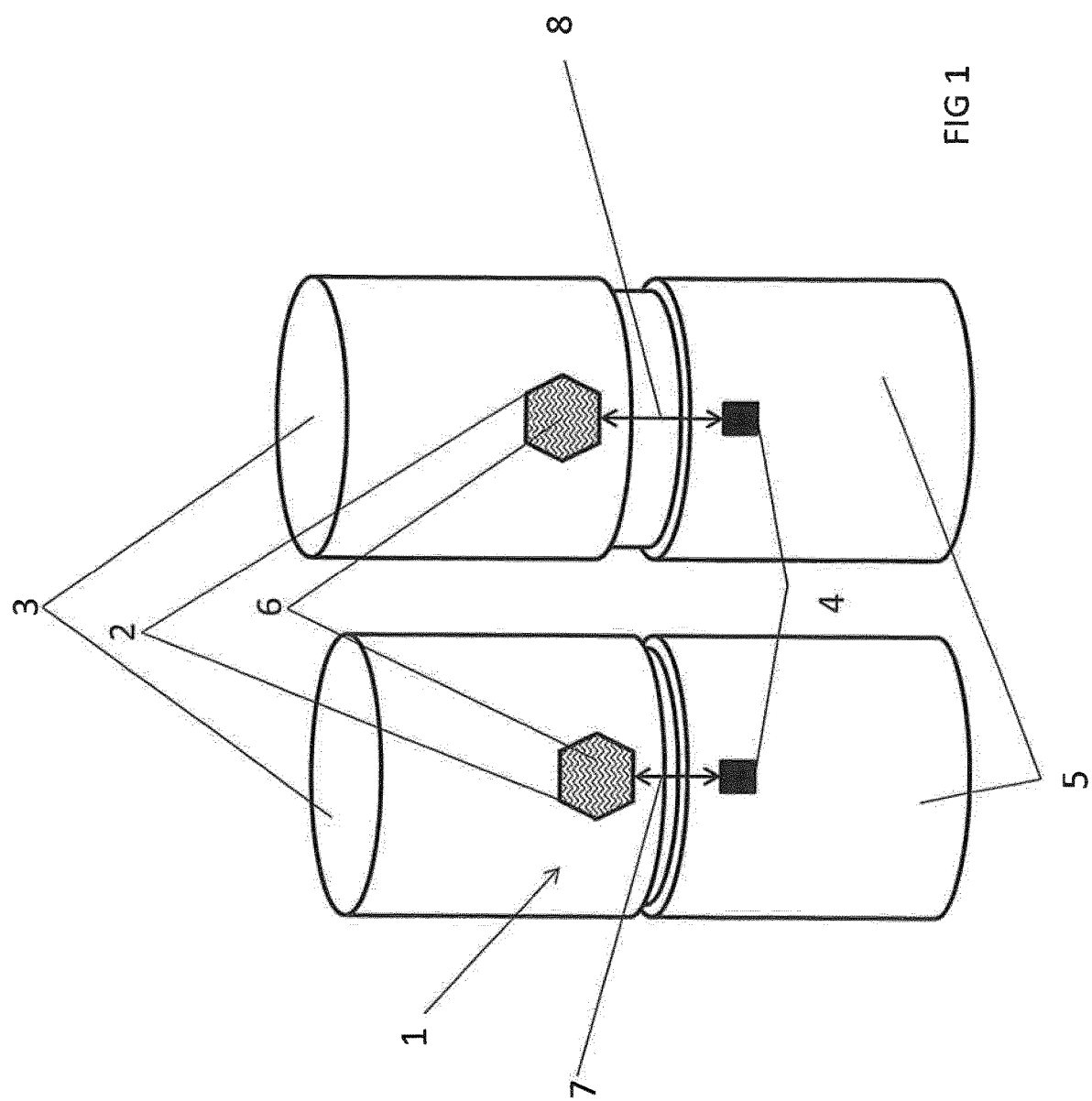
FIG. 1 schematically shows a bottle-open indicator with a security device according to the present teaching.

To design a security device, which allows to verify authenticity and integrity independently, one has to verify at least two aspects independently, so at least two security features are needed.

In a typical verification or authentication application, a programmable device is used, which extracts certain features from a security device using a sensor. In the present teaching we focus on features, which can be extracted using a programmable device comprising a camera. For example, a smartphone or tablet PC might be used. The extracted features are then compared to pre-determined features, describing how the security device is supposed to look like. If the extracted features match the pre-determined features, this indicates a positive result.

The nature of such security features is diverse. In many applications, static security features are used, which are pre-determined once and are shared by all entities of a particular security device. Examples for security devices with static security features are holograms, microprinting or watermarks on bank notes. All bank notes of a certain kind are supposed to have a valid entity of those particular security devices. A security device can be verified by extracting the security feature, e.g. observing a specific pattern, and then comparing the extracted features to pre-determined values, i.e. the pattern it's supposed to have.

In other applications, unique or random security features are used (see US 2016/0297231 A). In such applications, the pre-determined features are typically extracted during production of a particular entity of the security device and stored—often together with an identifier—in a memory, e.g. a data base. The data base can either be centralized or stored in e.g. a machine-readable code right next to the security device (see US 2015/0188706 A). For verification, the features as well as the identifier are extracted from the security device, with the identifier the pre-determined features are retrieved from the data base and compared to extracted features. If they match, the security device is authentic respectively intact.

Quite similar, one may model the verification of a security seal comprising an authentication and an integrity part. For an easy conceptual understanding, we may resort to another example. Ancient wax seals were used to protect the content of letters and the like. One could only read the letter, if the seal has been broken. If a letter is received by the recipient, he verifies the authenticity of the letter by checking the emblem on the seal (does it match the sender's signet ring) and for integrity he or she examines the seal, namely detects whether it has already been broken or not. If the seal is not tampered with, he knows he's the first one to read the letter. Otherwise, based on the seal, he might still be able to verify the authenticity of the sender, as the emblem might be broken in half, but is still recognizable. At the same time, however, the recipient knows, that the letter has already been opened, as the seal is broken. Therefore, the letter's content may already have been disclosed.

The proposed present teaching is conceptually much like an ancient wax seal. It features at least two security features; one, which is robust against tampering (corresponds to the emblem on the seal), and at least another one, which is guaranteed to change mechanically in a non-reversible manner and thus tamper-evident, i.e. indicating tampering (corresponds to the wax of the seal is broken). The recipient has to manually extract the features (e.g. emblem and condition of the seal) and—often unconsciously—compares it to the pre-determined values of the two security features (e.g. a particular emblem and "unbroken"). Yet, there is one important difference; with the ancient wax seal, the recipient has to have learned that information in advance, in order to verify the authenticity of a wax seal. Consequently, he needs to be educated and an expert to verify the authenticity of the wax seal. It is pretty much the same with today's security devices. As an example, one has to know (or learn), which particular behavior a hologram should exhibit, in order to verify whether a hologram is authentic or not. Such knowledge is commonly missing, i.e. a consumer normally does not have that knowledge. We therefore propose to use a programmable device comprising a camera, which is capable of looking up the pre-determined values and therefore allows a user without any prior knowledge or education to verify authenticity and integrity of the proposed security device. Similar, even today—as mentioned in the outset— tamper-evidence is mostly indicated visually, e.g. by partly destroying a security device (chessboard pattern, "void"-pattern) or destroying it in a way, such that it cannot be authenticated automatically any longer.

Surprisingly enough, to the best of our knowledge, there is currently no security device available, which can be verified in the same way as an ancient wax seal by a programmable device comprising a camera and using optical means. So there is no technology available, which allows to separately verify the authenticity, i.e. whether the security device originates from the genuine vendor, and its integrity, i.e. whether the security device has been tampered with. The main difference between this present teaching and the state of the art is that the authenticity of a security device can still be verified, even if the security device had been tampered with. While in the state of the art, verification systems of security seals or security devices typically have two values, namely intact or broken respectively authentic or counterfeit, the present teaching introduces a novel multi-state verification system comprising the results "authentic & intact", "authentic and not intact", "counterfeit & of integrity" and "counterfeit and not intact". Separation of the latter two states is irrelevant in practice, resulting effectively in a three-state verification system.

The goal is to design a security device comprising at least two security features characterized in that it has at least one security feature, which is tamper-evident and at least one other security feature, which is robust against tampering. The tamper-evident security feature is characterized in that tampering with the security device causes non-reversible changes in this security feature. The at least one robust security feature is characterized in that it is not affected by the tampering or in a way such that collateral changes in this security feature can be compensated (e.g. by data) or ignored.

FIG. 1 shows an application of a security device 1 according to the present teaching. The security device 1 comprises a hologram part 2 arranged on a cap 3 of a bottle (not shown) and a reference part 4 arranged on a neck 5 of the bottle. The optical properties 6 (indicated by a wave-pattern) of the hologram part 2 form the robust security features of the security device 1. Alternative to the hologram part 2, a foil pattern of a foil section could be used. The distance 7, 8 (indicated as double-headed arrows in the figure) between the border of the hologram part 2 and the border of the reference part 4 forms the tamper-evident security feature of the security device 1. As the parts 2, 5 of the security device are arranged on the same side of the bottle, a single image taken with the camera of a smartphone can capture both parts 2, 5 as well as their distance 7, 8. The optical properties of the hologram part 2 may require a second image to allow verification of variable optical properties. Then, both security features can be extracted from these two images.

The cap 3 and neck 5 together with the security device 1 can be part of bottle-open indication as disclosed in U.S. Pat. No. 9,114,912. In an original state of the bottle, the cap 3 is arranged at a pre-determined depth into the neck of the bottle. This pre-determined depth results in a pre-determined first value of the distance 7 between the hologram part 2 and the reference part 4. Once the cap 3 has been pulled off the neck 5, it is practically impossible to recover the original distance 7, but instead a different distance 8 will be assumed. This different distance 8 corresponds to a second value of the tamper-evident security feature. It is within a pre-determined range between a minimum distance, defined by the situation when the cap 3 is fully inserted into the bottle, and a maximum distance, limited by the extension of the cap below the hologram part 2.

Figure 2:
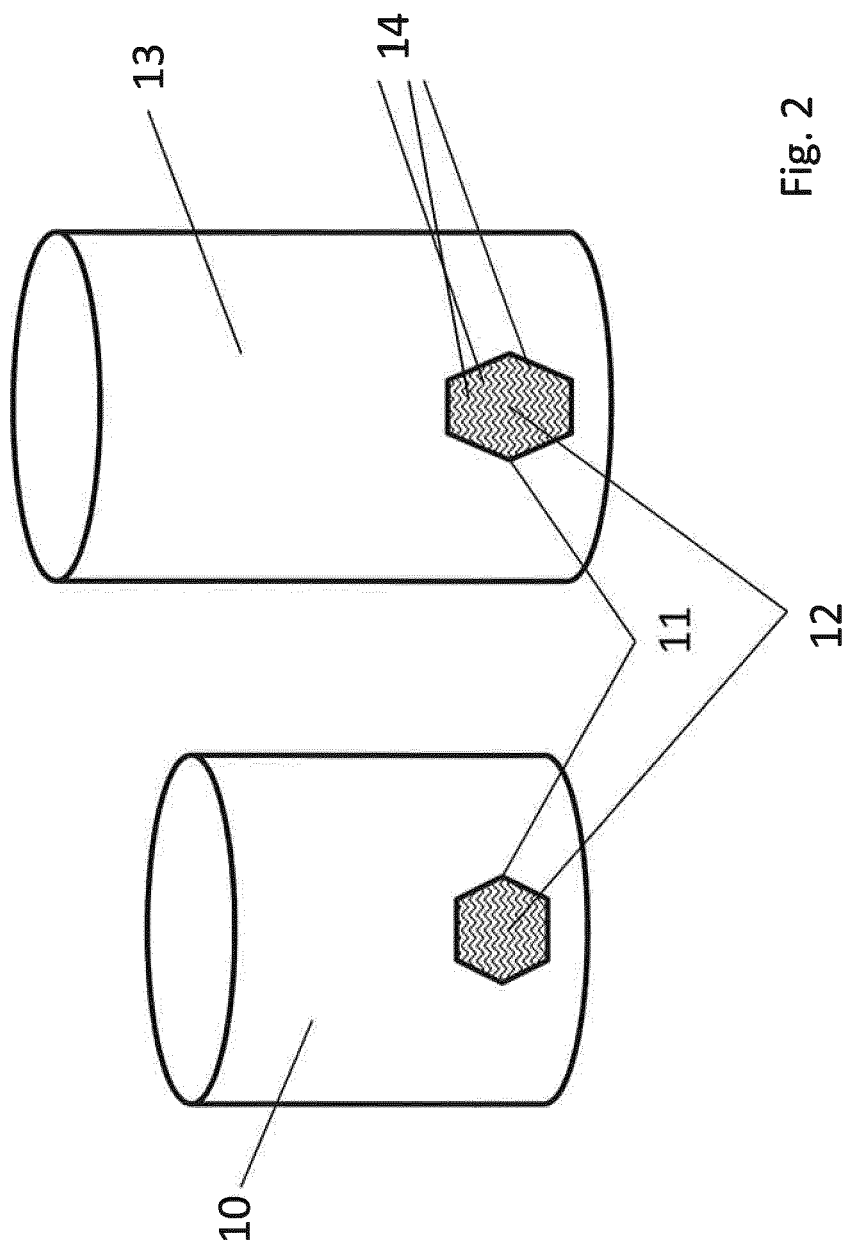
FIG. 2 schematically shows a foil wrapper with a security device according to the present teaching.

FIG. 2 shows another embodiment of a security device 11 according to the present teaching. Here the security device 11 comprises a foil pattern 12 printed on a foil 10 wrapping a product. The elements 14 of the foil pattern 12 are the robust security features of the security device 11. For accessing the product, the foil 10 is mechanically tampered by stretching. After stretching, it does not return to its original shape, but remains in an extended shape 13. The deformation of the foil 10, 13 also deforms the foil pattern 12, thereby changing the relative arrangement of the elements 14 of the foil pattern 12. The tamper-evident security feature is the distortion of the grid formed by the elements 14 (indicated as waves). For example, a first value of the tamper-evident security feature can be a pre-determined spacing between the elements 14. If this spacing is distorted between any two elements 14, this indicates mechanical tampering with the security device 11 and the integrity will no longer be confirmed. However the elements 14 themselves are still present, therefore allowing authentication of the security device 1.

In the following we will provide some additional examples for the construction of at least one robust and at least one tamper-evident security feature, which may in a beneficial setting be used for the present teaching.

Construction of Tamper-evident and robust security features.

Figure 3:
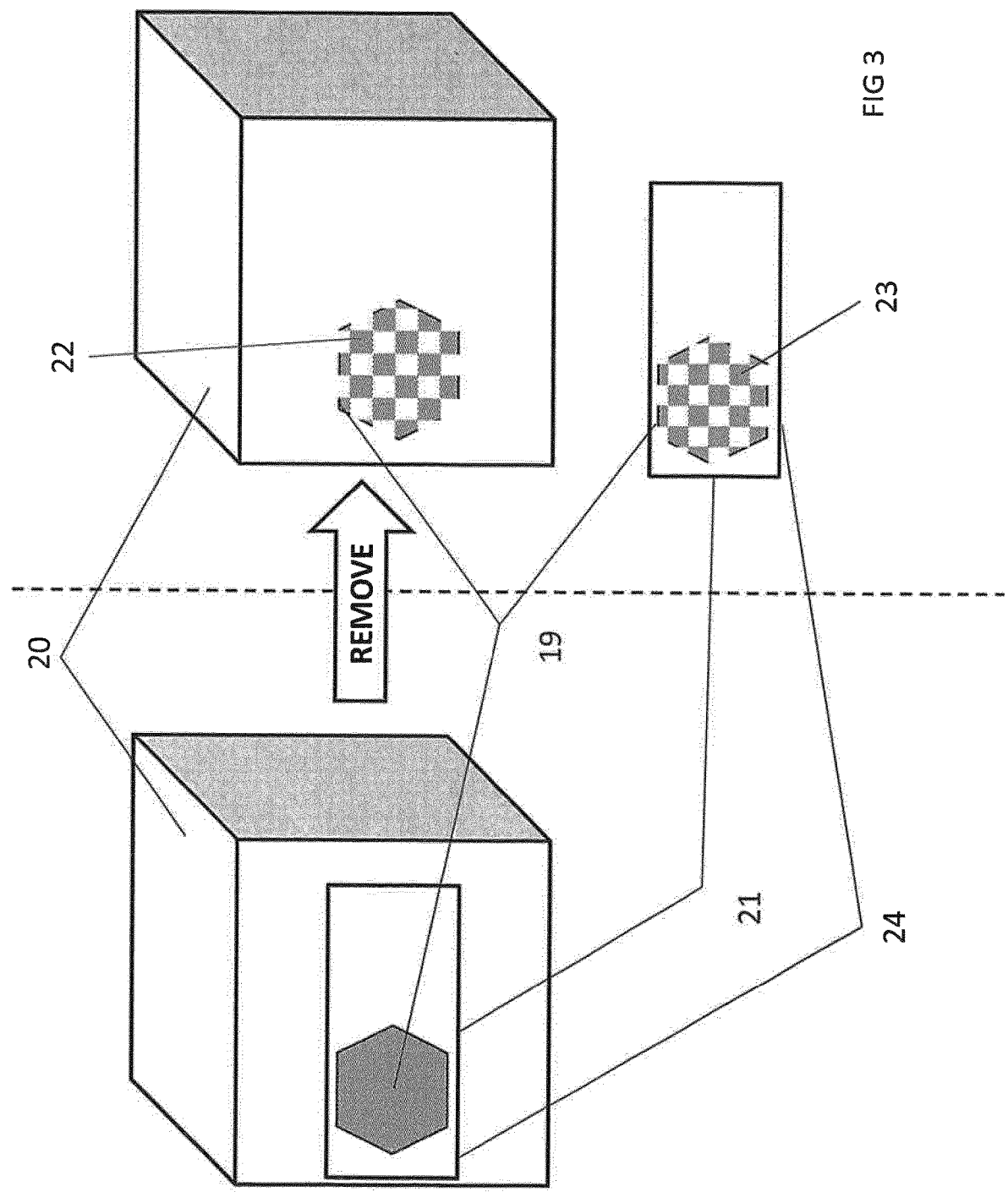
FIG. 3 schematically shows a package with a label comprising a security device comprising interleaved chessboard patterns before and after removal of the label.

As shown in FIG. 3, A security device 19 may be characterized in that it can be attached to a certain object 20. In a preferable setting, the security device is also attached to a carrier material 24, e.g. the security device is part of a security label 21. Said security device 19 may be subdivided into two or more sections, where the first section 22 is characterized in that it has stronger adhesion to the object while a second section 23 is characterized in that it has stronger adhesion to the carrier material. When the security label 21 is removed from the object 20, the first section 22, characterized in having stronger adhesion to the object, remains at the object 20. The second section 23, characterized in having stronger adhesion to the carrier 24, is removed from the object 20 together with the carrier material 24. In this example, the robust security features are formed by the parts of the first section 22, e.g. a foil pattern or hologram pattern. The tamper-evident security feature can be the pattern-filled area of the security device (for the "intact" state) and the arrangement of the chessboard borders with respect to the border of the security device 19 (for the "tampered" state; see FIG. 6 for different possibilities), or the structure of the frame of the security device 19, or both. Therefore, the security features are properties of completely overlapping parts of the security device 19.

For practical applications, many materials and technologies are available suitable to construct such structures with different adhesion or surface tension. These are often referred to as tamper-evident/tamper-resistant holographic materials or void holograms and are considered state-of-the-art (see for example U.S. Pat. Nos. 6,087,075 A, 8,944,470 B2 or WO 2012/035546 A2).

In another embodiment, the security device may be characterized in that it irreversibly geometrically transforms, once mechanically tampered with. Said irreversible geometrical distortions then being detected by the programmable device comprising a camera. For example a material as proposed in EP 1538554 A2 (refer in particular to the mechanical stress aspect).

Figure 4:
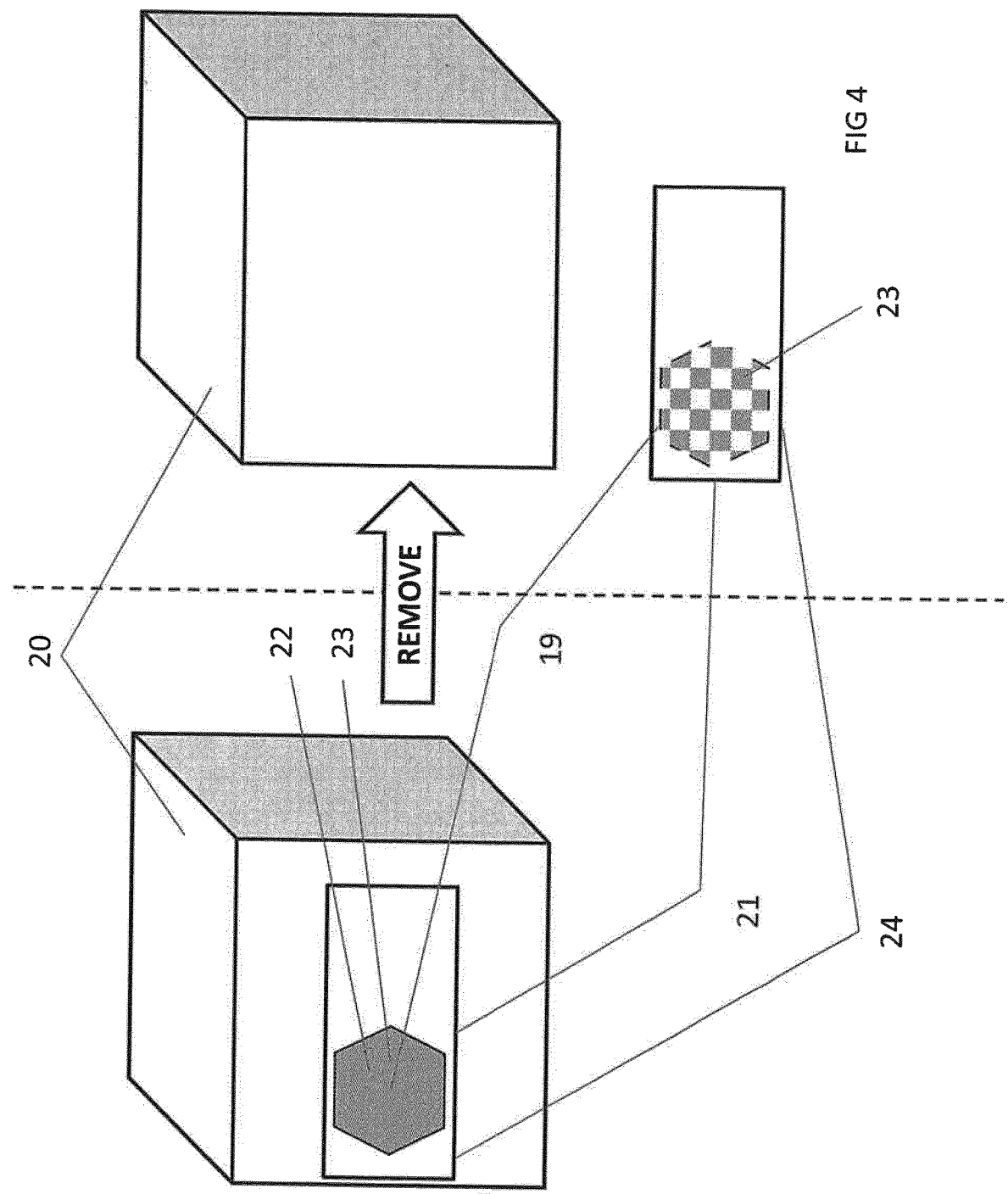
FIG. 4 schematically shows a first variant of the embodiment of FIG. 3, wherein one chessboard pattern disappears.

In another beneficial setting, pictured in FIG. 4, it is possible that the first section 22 is characterized in that removing the label 21 results in the first section 22 of the security device 19 to disappear, while the second section 23 remains at the carrier material 24. This can for example be achieved by means of different surface tension in the two or more sections 22, 23.

Figure 5:
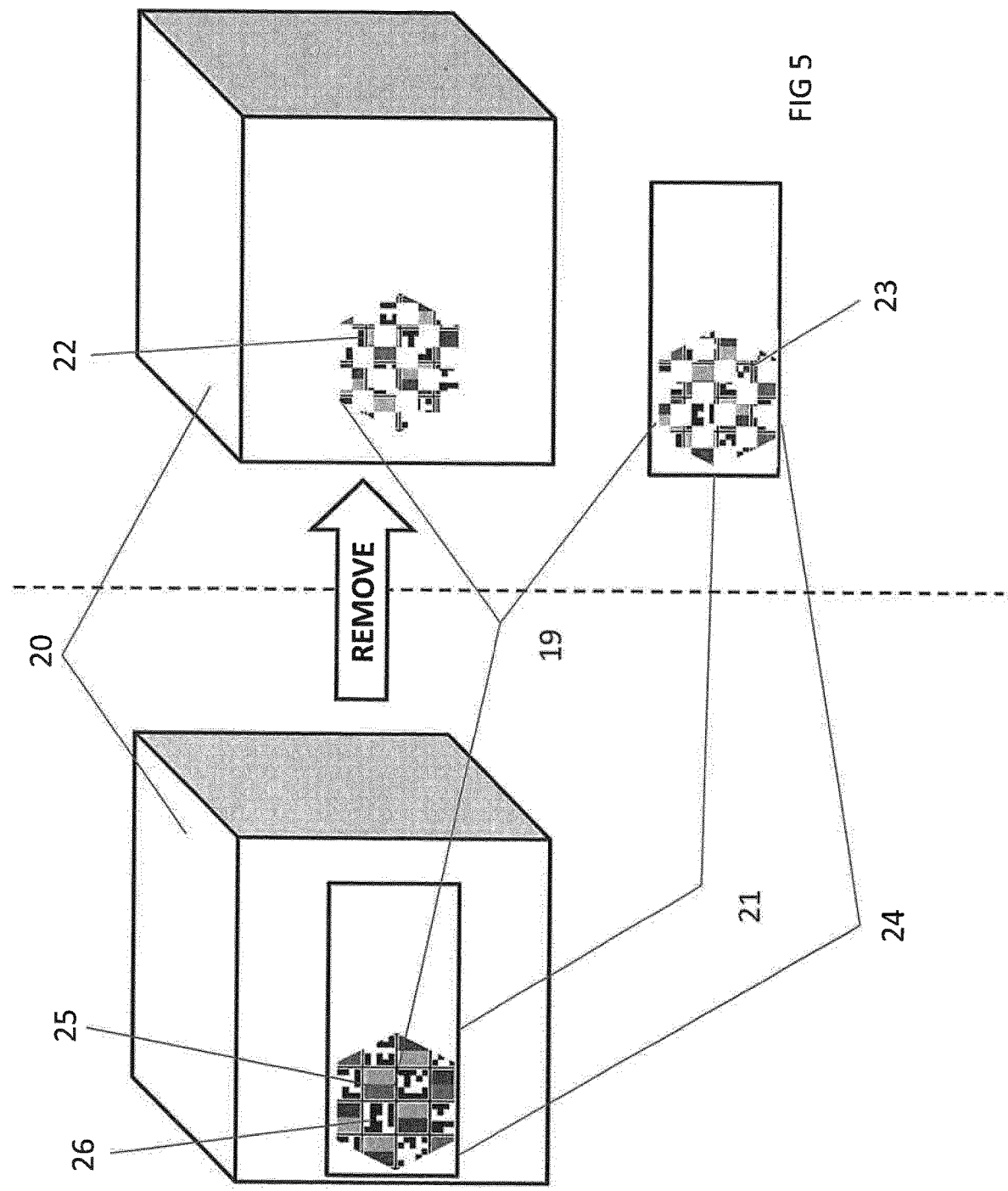
FIG. 5 schematically shows a second variant of the embodiment of FIG. 3, wherein the chessboard pattern fragments a security foil.

The pattern, which emerges as the security device is removed from the object, i.e. is tampered with, is often referred to as "void pattern". In FIGS. 3-5 a chessboard-void pattern is pictured. This pattern naturally provokes non-reversible mechanical changes to the security device. Once the void-pattern was activated through mechanical manipulation and the security device is basically split into two or more parts, it is practically impossible to reassemble the two or more parts. This is for example due to imperfections along the section borders. Even more so, as depicted in FIG. 4, the first section may eventually destroy itself and disappear respectively fall off. As shown in FIGS. 3 and 4, if the label is removed from the object, the void pattern emerges and basically "splits" the security device into two parts. A first part, which remains on the object and a second part, which is removed from the object and still connected to the carrier material. Now there are several options to verify authenticity and integrity of such a security device. As a tamper-evident security feature, e.g. the disrupted outline may be used. Alternatively or additionally, the void pattern itself may be detected. Both parts of the now-split security device still have fractions of intact areas of the original security device. These areas are unaffected by the tampering. For example, if the security device is an OVD, the optical characteristics within those unaffected regions are still the same as before the tampering. So they are robust against the tampering and may be therefore used as a robust security feature.

The void-pattern can be structured in a way, such that the security device satisfies the property of having at least one unchanged security feature, i.e. the robust security feature, and at least one altered security feature, i.e. the tamper-evident security feature, once it is mechanically manipulated, i.e. tampered with. Those at least two security features may also partially or completely overlap. As an example (refer to FIG. 5), we presume the security device is produced from a special-designed sheet-like product, as introduced in the European patent application no. 16188357.4, included herein by reference. Said sheet-like product is characterized in that it has marker regions 26, which preferably are machine-readable 2D-codes with a forward-error correction encoding, e.g. similar to Reed-Solomon encoding in Data-Matrix-Codes. Such an encoding—depending on the amount of redundant information—allows to destroy a certain percentage of the code while it still can be reliably and correctly decoded. Consequently, the marker-regions 26 are—albeit affected by the tampering—robust against tampering. There are several possibilities on how to construct the tamper-evident security feature. Straight forward, it may be detected if the void-pattern is visible. Alternatively, when decoding the such machine-readable marker regions, in typical implementations the decoding-error-rate is measured. The decoding-error-rate is expected to be much higher when reading from a security device, which has tampered with, than when reading from an intact security device. This is due to the fact that the void pattern destroys parts of the code, which results in a higher rate of classification errors (white/black) of the modules (modules are the black and white dots of a 2D-Code).

In practical applications, for such a security device with at least partially overlapping security features it might be beneficial to detect the properties of the tamper-evident security feature using a programmable device comprising a camera. These properties may then be used to conclude on which parts of the robust security feature may be affected by the tampering as well. Consequently, when extracting the properties of the robust security feature, this information can be used to mask out the affected regions, which might otherwise have negative influence on the detection accuracy and performance. Said information may also be used to look up pre-determined properties of a security device's raw materials. For example, in one preferable embodiment one could use a specially-designed sheet-like material as mentioned above, which comprises marker regions 26 which may be used to look up the visual properties of adjacent security patterns 25 of the security device. Preferably, the security device is constructed in a way that comprises more than one marker region 26. Presuming, a chess-board void pattern as shown in FIG. 5 may destroy a significant portion of the marker regions 26. Said marker regions 26 may in a preferable embodiment be designed with forward-error correction codes, which makes them robust against a certain magnitude of damage. As long as one of said marker regions 26 can be decoded by the programmable device comprising a camera, the pre-determined visual characteristics of the adjacent parts in the sheet-like product may be determined. Consequently, from the at least one decode-able marker region 26 the visual pre-determined properties of the security-device are known. So for authentication, the optical properties of the security device can be verified in exactly those regions, which are not affected by the mechanical tampering, i.e. the robust security features, which are not altered. This transforms the extraction of the robust security feature's properties from an extraction respectively identification-task to a verification task. It is well known in the art of image processing and computer vision that verification tasks, i.e. does some image match a template, are much more efficient, robust and less error-prone than identification tasks, where the right template has to be found in a large data base of templates. In this preferable embodiment, the properties extracted from the at least one tamper-evident security feature are used to compensate the (undesired) effects of the mechanical tampering on the at least one robust security feature and therefore makes the authentication process easier.

This concept can be adapted to Barcodes, 2D-Codes and the like. In such settings, it may be of interest to note, that Barcodes and the like typically use a forward-error correction encoding, such as Reed-Solomon. This splits the codes into multiple code-words, each distributed among the code area and encoding redundant information. Hence, if parts of the code get destroyed, it might still be possible to retrieve the actual content, due to the redundant information. However, one might experience a significantly higher error rate while decoding. Therefore, the code content may act as a robust security feature, while the error rate clearly increases as the security device, i.e. the barcode, is tampered with. If a threshold is applied or the error rate is correlated to other parameters (quality of the image, focus, exposure, . . . ), deviation from the pre-determined average error rates can be detected, e.g. with simple thresholding. This may then be used as a tamper-evident security feature, where an intact state, corresponding to the intact security device, is indicated by the extracted decoding error rate matching the expected average decoding error rate of intact or undestroyed codes. In a second "tampered" state, the decoding error rate exceeds said threshold or matches a value, which is pre-determined based on the characteristics of the expected altering of the security device due to manipulation or mechanical stress.

As mentioned, the present teaching may be used to control the access to an additional value, e.g. a privilege, registered to or protected by the security device. This value should only be accessible, if the security device is in the state "Authentic and tampered with" respectively "Authentic and not intact". So contrary than in most security solutions, tampering with the security device is a good (and necessary) thing in order to make the additional value accessible. Consequently, it might be beneficial to design the tamper-evident security feature in a way, such that it offers additional security. This may be done by verifying whether e.g. the void-pattern has the correct dimensions, pattern, outline and/or offset in respect to a reference mark. Such reference marks may be the outline of the security device, any part of a security level, an additionally placed reference mark etc.

In a preferable setting, the used security device is characterized in that it has unique features. In such a setting, the unique features are typically pre-determined (e.g. in production) and stored—together with an identifier—in a data base. When authenticating said security device, the identifier is retrieved (e.g. by optical means from a 2D-Code, barcode or the like), the pre-determined features requested from the data base and the features extracted e.g. by optical means, from the security device. If the extracted features match the pre-determined features, the authentication result is positive. A very similar approach may be used with the tamper-evident security feature. If the tamper-evident security feature is constructed in a way such that it is unique, its features may be pre-determined and stored in a data base. For example, if the security device is made of a sheet-like product (refer FIG. 5) with marker regions 26 and security patterns 25 as described above, the offset of the chessboard-void-pattern depicted in 5 in respect to e.g. the marker-regions 26 of the sheet-like product may be determined in production. This offset might be periodical and consequently the offset is shared by multiple entities of said security device.

Figure 6:
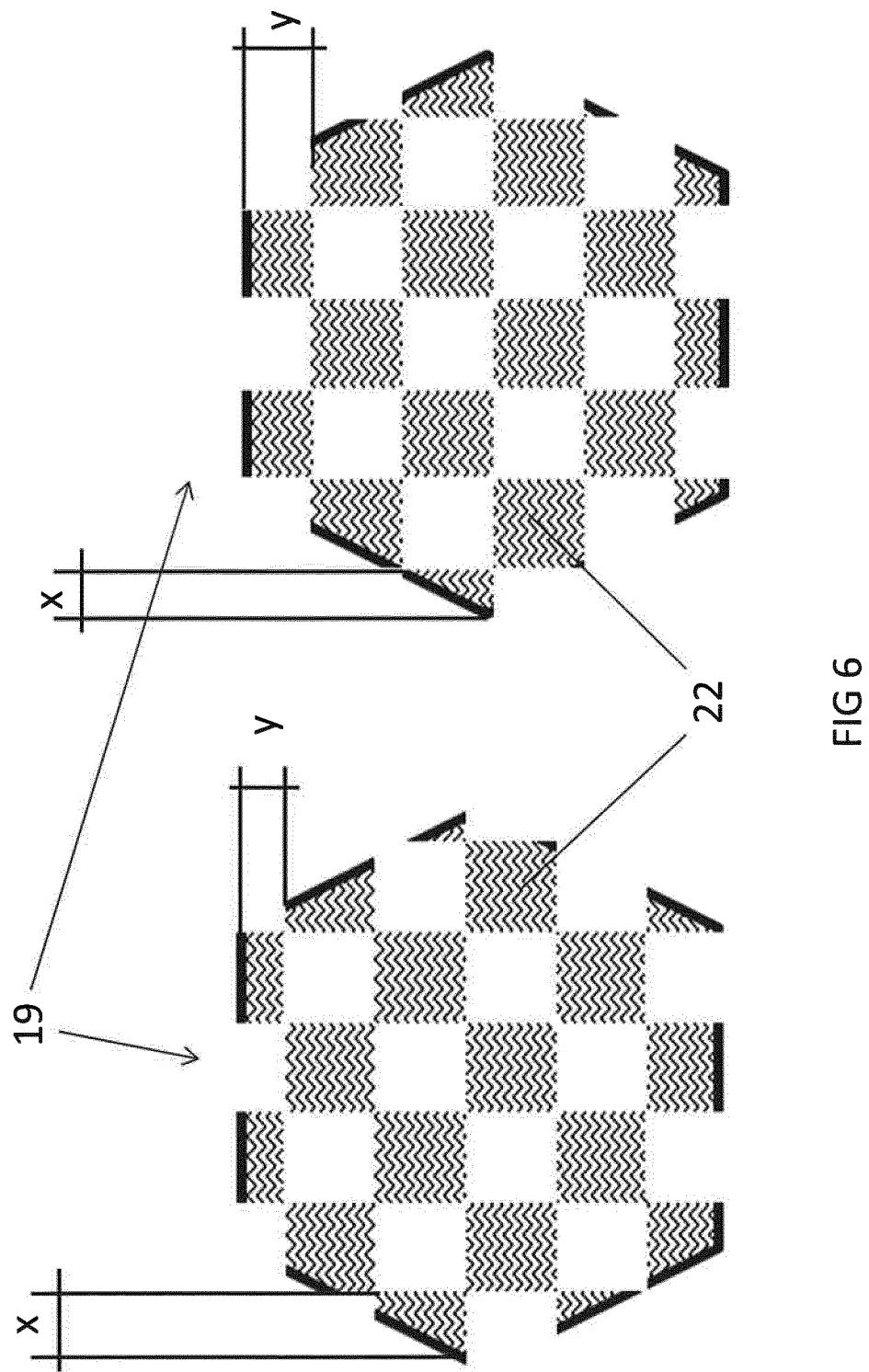
FIG. 6 schematically shows different arrangements of chessboard patterns with respect to the same basic material.

FIG. 6 shows two security devices 19 similar to the security device shown in FIG. 3, with a different pattern offset 27, 28 in x- and y-direction in respect to the security devices 19 most left and most-top points. These offsets x, y correspond to the second state of the tamper-evident security feature, i.e. the expected state of the tamper-evident security feature in the "tampered" security device. By extracting the offsets x, y, the tampered state can be confirmed. The offsets x, y can be extracted only when the section 22 of the security device having stronger adhesion to the object 20 (see FIG. 3) than to a substrate is revealed, i.e. after the security device 19 has been mechanically tampered with. The offsets x, y are also security features, because they are difficult to replicate, especially if random offsets registered with an identifier (not shown) of the security device are used.

In an alternate setting, the pattern may be varied or changed randomly. Especially if unique security features are used for the at least one robust security feature, the security device may already comprise an identifier. The features of the variable or random pattern, i.e. the unique values of the tamper-evident security feature, are then pre-determined during production, e.g. by optical means or via production parameters, and stored—together with the pre-determined values from the at least one robust security feature—alongside the identifier (not pictured).

Finally, FIG. 7 illustrates a possible embodiment of the steps involved and results obtained by examining the proposed security device 19 with a programmable device comprising a camera 33. Assume an authentic security device 19 with pre-determined values for the Robust Security Feature R.SF 35 and the Tamper-evident security Feature TE.SF 36. The Robust Security Feature may have properties describing the pattern information and optical characteristics as well as the outline shape. The Tamper Evident Feature 36 may for instance be described by properties characterized in that it contains the information content of the marker regions, or the error correction rate when decoding the marker regions, or the information on how the void pattern, comprising at least two sections, where at least one section 22 has stronger adhesion to the object and another section 23 has stronger adhesion to a substrate material, is distributed.

If the security device 19 is examined in its original state 30, the programmable device comprising a camera 33 may extract the properties of the robust feature 35, e.g. the pattern information and optical characteristics, and a first value of the tamper-evident security feature 36, which is visible in this state (e.g. the integrity of the marker regions). Consequently, the programmable device comprising a camera 33 may determine a property-match 37 for the robust security feature 35 and a specific match I 38 (according to a first value or state) for the tamper-evident security feature 36. Consequently, the user could be told that the security device 19 is authentic 42, yet he is not privileged to do a specific action, because a proof of purchase could not be brought. He might then be engaged to open the packaging or container, which manipulates the security device mechanically, i.e. is rightfully tampered with.

If now the same security device 19 is being tampered with 31, it is irreversibly transformed to a tampered state 32. If it now is examined by the programmable device comprising a camera 33, it might still be possible to retrieve the properties of the robust security feature 35, using strategies and technologies explained in detail earlier. However, the void-pattern formed by the different sections 22,23 has become visible, consequently the programmable device comprising a camera 33 is able to extract the second value of the tamper-evident security feature 36 (e.g. the alignment of the void-pattern with respect to the marker regions). As the properties of the robust security feature 35 match 37 and the tamper-evident security feature 36 matches II 39 its pre-determined second values as well. Consequently, we know that we have an authentic security device, which has been tampered with, which can be seen as a proof of purchase 43. Consequently, the user might get the privilege to do a specific action 43.

Not shown; While with a sensible choice for the robust security feature 35 it is next to impossible to counterfeit the robust security feature 35, we want to empathize that also a visible void-pattern, formed by the sections 22,23, may e.g. be offset from the pre-determined position (as shown in FIG. 6). Consequently, in this case the tamper-evident security feature 36 would result in a no-match as well, ultimately preventing a proof of purchase 43. This might be an interesting aspect, if the programmable device comprising a camera 33 is configured in a way such that it can distinguish whether the tamper-evident security feature 36 mismatches, because its properties could not be extracted or it mismatches, because it has the wrong properties. In such a setting, the tamper-evident security feature could be considered (for example in a weighted way) in the authenticity-decision of the security device as well.

In a third setting, a non-authentic security device 45 is examined by the programmable device comprising a camera 33. Obviously, the extracted properties of the robust security feature 35 will not match 40 its pre-determined values. This already indicates a counterfeit 44 result, however, for the sake of completeness, the independent verification of the tamper-evident security feature 36 results in non-matching properties 38 as well.

So the presented security device can be employed to realize a "proof-of-purchase" use case, respectively trigger some action, pre-conditioned by having an authentic but tampered-with security device. In this context, tampering with the security device can be seen as "activating" it.

The invention claimed is:

1. A security device attached to an object, the security device comprising:
   a carrier material, and
   a structure arranged between the carrier material and the object and having at least two security features,
   wherein at least one of said security features is a tamper-evident security feature, which is configured to alter irreversibly upon a mechanical tampering with the security device,
   wherein at least one other of said security features is a robust security feature, which is robust against the mechanical tampering with the security device,
   wherein the at least two security features can be extracted from at least one image of the security device with a programmable device having a camera at least in an intact state of the security device,
   wherein the structure is partitioned into at least two sections,
   wherein at least one section has stronger adhesion to the object and at least one other section has stronger adhesion to the carrier material,
   wherein the structure is configured to partially destroy or split the security device upon tampering with the security device,
   wherein the at least one robust security feature is distributed among the at least two sections, such that the at least one section remaining on the object and/or the at least one other section can be authenticated.

2. The security device according to claim 1, wherein the at least two security features can be extracted from at least one image of the security device with a programmable device having a camera also in a tampered state of the security device.

3. The security device according to claim 1, wherein in an intact state of the security device, the at least one tamper-evident security feature of the security device assumes a pre-determined value or state.

4. The security device according to claim 1, wherein in a tampered state of the security device, the at least one tamper-evident security feature of the security device assumes a pre-determined value or state or a value within a pre-determined range.

5. The security device according to claim 1, wherein the at least two security features are properties of partially or completely overlapping parts of the security device.

6. The security device according to claim 1, wherein at least one security feature is a random or unique security feature.

7. The security device according to claim 1, wherein the security device comprises an identifier.

8. A method for verifying a security device having at least two security features, where at least one of said security features is a tamper-evident security feature, which is configured to alter irreversibly upon a mechanical tampering with the security device, and at least one other of said security features is a robust security feature, which is robust against the mechanical tampering with the security device, the method comprising:
  recording at least one image of the security device;
  extracting the at least two security features from the at least one recorded image;
  comparing the value of the at least one extracted robust security feature with a pre-determined value and notifying authenticity of the security device if the compared values match; and
  comparing the value of the at least one extracted tamper-evident security feature with a pre-determined value or state corresponding to an intact state of the security device and notifying integrity of the security device if the comparison finds a match.

9. The method according to claim 8, further comprising:
  comparing the value of the at least one extracted tamper-evident security feature with a pre-determined value or state or a pre-determined range of values, corresponding to a tampered state of the security device and notifying tampering of the security device if the comparison finds a match.

10. The method according to claim 9, wherein before notifying authenticity, it is checked whether the at least one extracted tamper-evident security feature either matches a pre-determined value or state, corresponding to an intact state of the security device, or matches a pre-determined value or state or a pre-determined range of values, corresponding to a tampered state of the security device, and authenticity is notified only if one of these matches is found.

11. The method according to claim 8, characterized by employing the extracted and/or pre-determined value of the at least one tamper-evident security feature to support the extraction and/or authentication of the at least one robust security feature.

12. The method according to claim 8, further comprising:
  before the comparing steps, extracting an identifier of the security device from the at least one recorded image and retrieving a pre-determined value or state or a pre-determined range of values, corresponding to a value or state of the tamper-evident security feature in an intact or tampered state of the security device, and associated with the extracted identifier, from a memory.

13. A programmable device comprising a camera and configured to perform the steps of the method according to claim 8 and to indicate the authenticity and/or integrity of the security device and/or to trigger a specific action based on the combination of the authenticity and integrity results.

* * * * *